United States Patent
Neer et al.

(10) Patent No.: US 9,319,227 B2
(45) Date of Patent: Apr. 19, 2016

(54) AUTOMATIC CONTENT CREATION BASED ON GROUP COLLABORATION SPACES

(75) Inventors: Robert Neer, Seattle, WA (US); Charles Goran, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 476 days.

(21) Appl. No.: 13/247,826

(22) Filed: Sep. 28, 2011

(65) Prior Publication Data
US 2012/0079396 A1 Mar. 29, 2012

Related U.S. Application Data

(60) Provisional application No. 61/387,278, filed on Sep. 28, 2010.

(51) Int. Cl.
| | | |
|---|---|---|
| *G06F 3/00* | (2006.01) | |
| *G06F 17/00* | (2006.01) | |
| *H04L 12/18* | (2006.01) | |
| *G06Q 10/10* | (2012.01) | |

(52) U.S. Cl.
CPC .......... *H04L 12/1822* (2013.01); *G06Q 10/107* (2013.01); *G06Q 10/109* (2013.01)

(58) Field of Classification Search
CPC .................................................. G06Q 50/01
USPC ................... 715/200, 751, 745, 798
See application file for complete search history.

(56) References Cited

U.S. PATENT DOCUMENTS

| | | | | |
|---|---|---|---|---|
| 8,091,032 B2 * | 1/2012 | Fischer | .................. | 715/751 |
| 8,285,840 B2 * | 10/2012 | Dobroth et al. | ............... | 709/224 |
| 8,386,506 B2 * | 2/2013 | Martinez et al. | ............... | 707/759 |
| 8,775,400 B2 * | 7/2014 | Ickman et al. | ................ | 707/707 |
| 8,843,463 B2 * | 9/2014 | Moritz et al. | .................. | 707/705 |
| 8,856,225 B2 * | 10/2014 | Pearce | .................. | 709/204 |
| 2003/0050986 A1 * | 3/2003 | Matthews et al. | ............. | 709/206 |
| 2007/0214180 A1 * | 9/2007 | Crawford | .................. | 707/104.1 |
| 2007/0294348 A1 * | 12/2007 | Cohen et al. | .................. | 709/204 |
| 2008/0208973 A1 * | 8/2008 | Hayashi et al. | ............... | 709/204 |
| 2010/0049852 A1 * | 2/2010 | Whitnah et al. | ............... | 709/226 |
| 2011/0153412 A1 * | 6/2011 | Novikov et al. | ........... | 705/14.42 |
| 2011/0302152 A1 * | 12/2011 | Boyd et al. | .................... | 707/722 |

OTHER PUBLICATIONS

Rick Broida, "Use Text Messaging to Add Events to Google Calendar", published Apr. 21, 2010, PCWorld, pp. 1-2.*

* cited by examiner

*Primary Examiner* — Manglesh M Patel
(74) *Attorney, Agent, or Firm* — Lee & Hayes, PLLC

(57) ABSTRACT

Devices described herein are configured to receive a post to a collaboration space shared by a group of users and provide the post to the group of users through a user interface associated with the collaboration space. In some embodiments, the group of users is a social network or social network group. The devices are further configured to automatically create a content item associated with an application of a device of at least one user of the group of users based on the post, the content item accessible through a user interface of the application.

20 Claims, 6 Drawing Sheets

AUTOMATIC CONTENT CREATION BASED ON GROUP COLLABORATION SPACES

RELATED APPLICATIONS

This U.S. patent application claims priority to provisional U.S. patent application No. 61/387,278, entitled "Flexible Family Notes," and filed on Sep. 28, 2010. Provisional U.S. patent application No. 61/387,278 is incorporated herein in its entirety by this reference.

BACKGROUND

Friends, families, and other groups have more ways of staying in contact with each other than ever before. Phone, email, text and video messaging, and social networks all allow groups to communicate in new and different ways. For example, a group of friends may exchange a series of email or posts in a chat room to determine a time and location for enjoying dinner together. Upon coming to an agreement, the friends may also, at their discretion, add appointments to their calendars to remind themselves of the dinner.

A number of these modes of communication provide a shared communication space, such as chat rooms, virtual bulletin boards, instant messaging conversations, social network group spaces, etc., that allow participants in the shared communication space to view each other's posts in a conversation-like sequence. To create content related to these posts, such as events, polls, pictures in an album, etc., the participants must make, on their own initiative, new items for these applications. These items in turn are based on the participants' recollection of the conversation held in the communication space, which may have occurred sometime before.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for receiving a post to a collaboration space shared by a group of users and providing the post to the group of users through a user interface associated with the collaboration space. In some embodiments, the group of users is a social network or social network group. The device or devices performing the receiving and providing may include client devices, group servers, or some combination of both. These device(s) are further configured to automatically create a content item associated with an application of a device of at least one user of the group of users based on the post, the content item accessible through a user interface of the application. The automatic creation of the content item may be based on a user interface control (hereinafter "UI control") selected by a member of the group when providing the post or based on an analysis of the post to determine whether the post is associated with an application type or a content item type.

The user interface associated with the collaboration space appears as a representation of a paper note with one or more posts in the collaboration space displayed in the paper note as text and/or graphics. Also, the application may be one of a photo gallery, an event list, a calendar, a poll repository, a list repository, an audio library, or a video library and the content item may be a corresponding one of a photo, an event, a calendar appointment, a poll question, a list, an audio file, or a video file.

Further, the device(s) may receive input merging a representation of one collaboration space with another to create a resultant, merged creation space. The input may take the form of graphical manipulation of the representation.

Overview

Figure 1A:
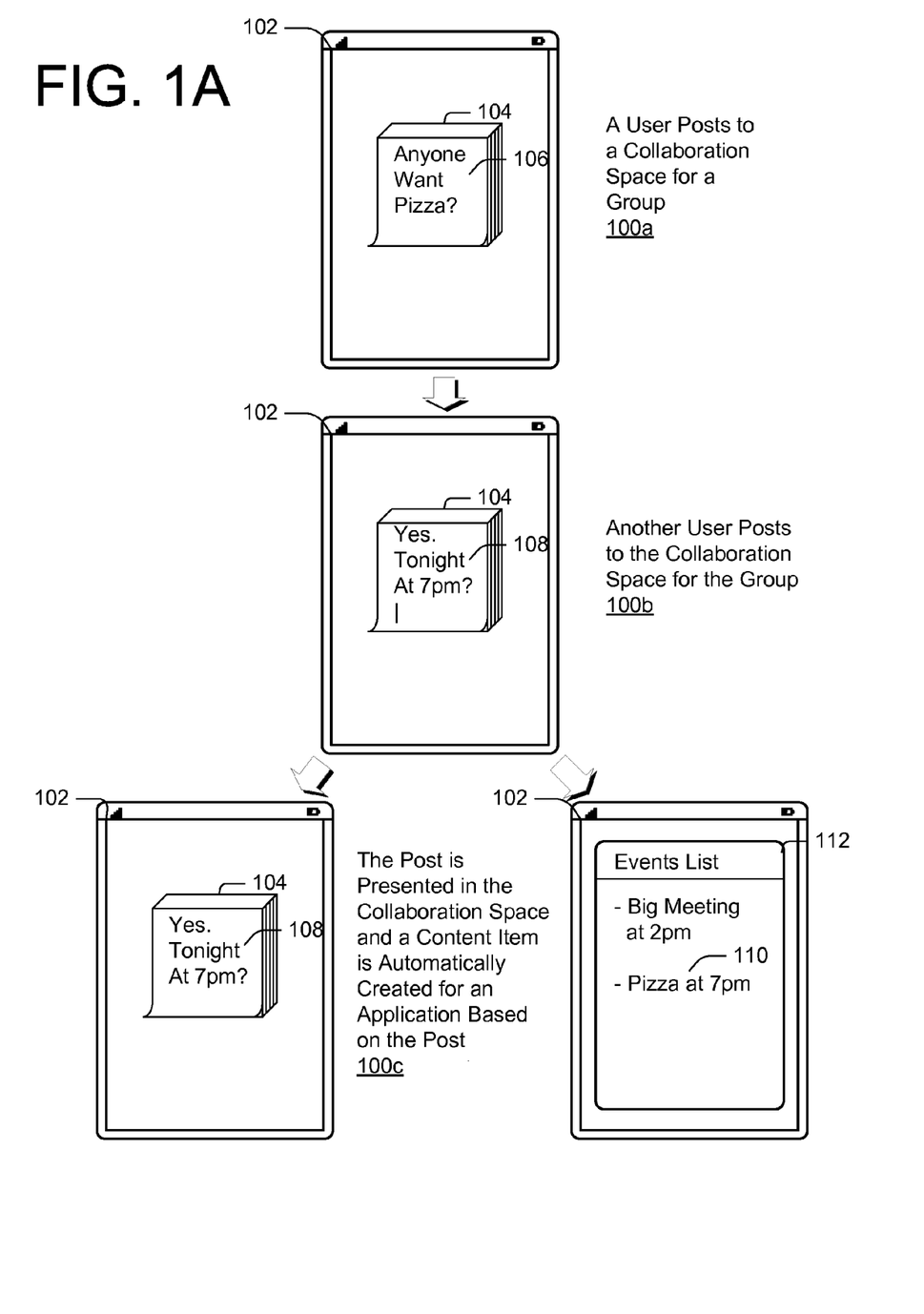
FIGS. 1A-1B are diagrams showing example user interactions with a collaboration space and effects of those interactions, in accordance with various embodiments.
Figure 1B:
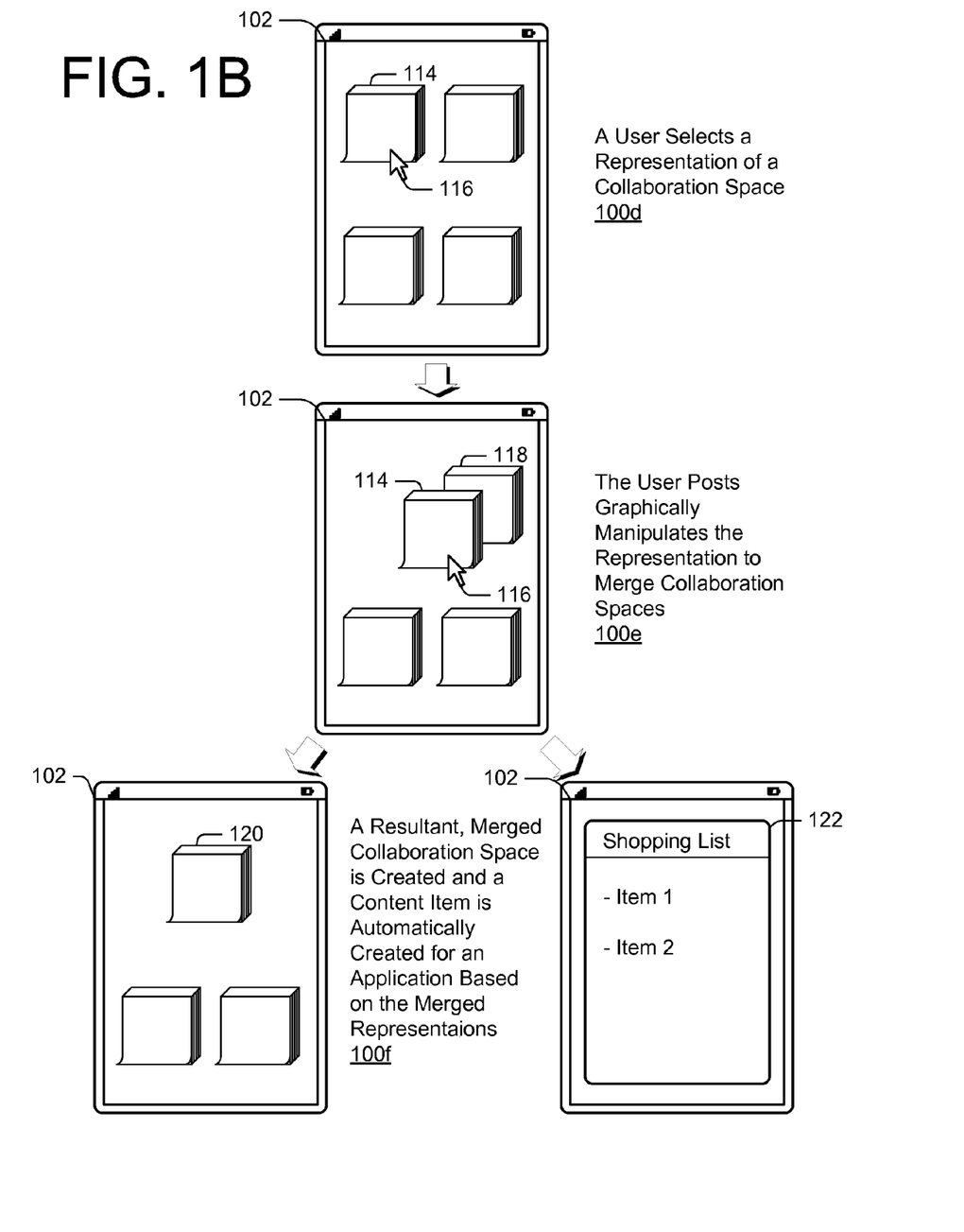

FIGS. 1A-1B are diagrams showing example user interactions with a collaboration space and effects of those interactions, in accordance with various embodiments. As shown in FIG. 1A, user interactions with a user interface of a collaboration space at stages 100a, 100b, and 100c result in the updating of the collaboration space user interface and the automatic creation of content items associated with applications of the user.

At stage 100a, a user belonging to a group of users interacts utilizes his or her client device 102 to interact with a collaboration space user interface 104. That interaction includes the user entering and providing a post 106 to the collaboration space user interface 104. For example, the user may enter text as the post 106, such as "Anyone want pizza?" The collaboration space user interface 104 shows the post 106 as the user enters it. In some embodiments, the post 106 is only provided to the client devices 102 of other members of the group of users once the user has completed entry of the post 106. In other embodiments, the post is shown immediately as it is entered on the collaboration space user interfaces 104 of each member of the group of users. Further, in addition to or instead of text, the post 106 may be or include any one or more of a photo, a video, an audio clip, an event, a calendar appointment, a poll, or a list.

In some embodiments, the collaboration space user interface 104 may include or be visually accompanied by UI controls indicating the application type or content item type associated with the post being entered. For example, the UI controls may indicate that the post 106 is associated with a photo gallery, an event list, a calendar, a poll repository, a list repository, an audio library, or a video library. The user may select one of the UI controls prior to or while entering the post 106.

As shown in FIG. 1A, the collaboration space user interface 104 may appear as a representation of a paper note with one or more posts in the collaboration space displayed in the paper note as text and/or graphics. While the collaboration space user interface 104 shown in FIG. 1A only shows one post 106 at a time, it is to be understood that the collaboration space user interface 104 may display multiple posts 106 in a sequence or in some other form. In some embodiments, the collaboration space user interface 104 may be a user interface of a social network or social network group.

In various embodiments, either during entry of the post 106 or upon completion of entry, the post 106 is displayed in the collaboration space user interface 104 of each member of the group of members. As discussed further herein, the post 106 may be disseminated to the members of the group in a peer-to-peer or client-server fashion. As described further below, the group may be a family, a set of friends, a social network, a social network group, or any other group defined by the users as a set of users to share in the collaboration space.

At stage 100b, a member of the group enters another post 108. The other post 108 may be responsive to the previous post 106 or unrelated to the post 106. Continuing with the above example, a user may answer the post "Anyone want pizza?" with "Yes. Tonight at 7 p.m.?" This post 108 may be entered in the same manner as the post 106 or in a different manner, and may or may not involve display and selection of a UI control.

At stage 100c, the post 108 entered in stage 100b is provided to the members of the group and displayed in the collaboration space user interfaces 104 of the members of the group. In addition to providing the post 108, the client device 102 of at least one member of the group participates in automatically creating a content item associated with an application of that member or with an application of another member. The application may be one of a photo gallery, an event list, a calendar, a poll repository, a list repository, an audio library, or a video library and the content item may be a corresponding one of a photo, an event, a calendar appointment, a poll question, a list, an audio file, or a video file. The client device 102 or a group server may determine which application to create a content item for based on a UI control that was selected while entering the post 108 or based on an analysis of the post 108. For example, the client device 102 or group server may determine by analyzing the post 108 that the post includes a date and/or time. Upon making this determination, the client device 102 or group server informs client device applications or platforms or a service of the group server or another server of the date and/or time to cause the application, platform, or service to create a content item. In the case of a date and/or time, the content item may be an event or calendar appointment and the application, platform, or service may be an events list or calendar. The application, platform, or service may be informed through interfaces of the application, platform, or service and of one or more modules associated with the collaboration space.

In some embodiments, in addition to creating the content item, the client device 102 or group server may enhance the post 108 based on member or group characteristics. Such characteristics may include histories or profiles. For example, if one member of the group indicates a preference for a certain pizza establishment, the client device 102 or group server may add that pizza establishment to the date and time included in post 108 as a location to meet for pizza.

In various embodiments, once the content item is automatically created, it may be viewed as an entry 110 in a user interface 112 associated with the application. In some embodiments, the user interface 112 is automatically launched upon creation of the content item, while in others the collaboration space user interface 104 remains displayed, and the users may navigate at their convenience to the user interface 112 to view and/or interact with the entry 110.

FIG. 1B illustrates further user interactions with the user interface of a collaboration space at stages 100d, 100e, and 100f resulting in the creation of a resultant, merged collaboration space. At stage 100d, a user interacts with a representation 114 of a collaboration space. In a touch screen embodiment, the user may place his or her finger on the display of the client device 102 at the location of the representation 114. In other embodiments, the user may move a cursor 116, such as an arrow or hand, to hover over the representation 114. The cursor 116 may be moved using a mouse, touchpad, keypad, or any other mechanism. As shown in FIG. 1B, the client device 102 may display representations of a number of collaboration spaces in which the user of the client device 102 shares. Upon touching the screen or moving the cursor 116, the user selects the representation 114.

At stage 100e, the user graphically manipulates the representation 114 by dragging the representation 114 to hover over a representation 118 for another collaboration space. In some embodiments, the collaboration spaces corresponding to the representations 114 and 118 are both shared by the same group of user. In other embodiments, a user may belong to multiple groups of users and may have a user interface that displays representations of collaboration spaces associated with multiple groups. In a further embodiment, the user may belong to multiple groups of users, but each group may be associated with a separate user interface showing only representations of collaboration spaces associated with that group.

At stage 100f, a resultant, merged collaboration space that includes the posts of the collaboration spaces represented by representations 114 and 118 is automatically created responsive to the graphic manipulation performed at stage 100e. This resultant, merged collaboration space may be represented by a representation 120 that may replace or supplement representations 114 and 118.

In various embodiments, the graphic manipulation may also result in the automatic creation of a content item associated with an application. The automatic creation of the content item may be based on types associated with the merged collaboration spaces or on a type determined for a resultant, merged collaboration space. For example, one or both of the merged collaboration spaces may be associated with the type 'list,' or the type 'list' may be determined for the resultant, merged collaboration space based on an analysis of the content of the resultant, merged collaboration space. The content item may then be created in a same or analogous manner to the content item created at stage 100c, and the user may view the content item through a user interface 122 of the application.

Example Environment

Figure 2:
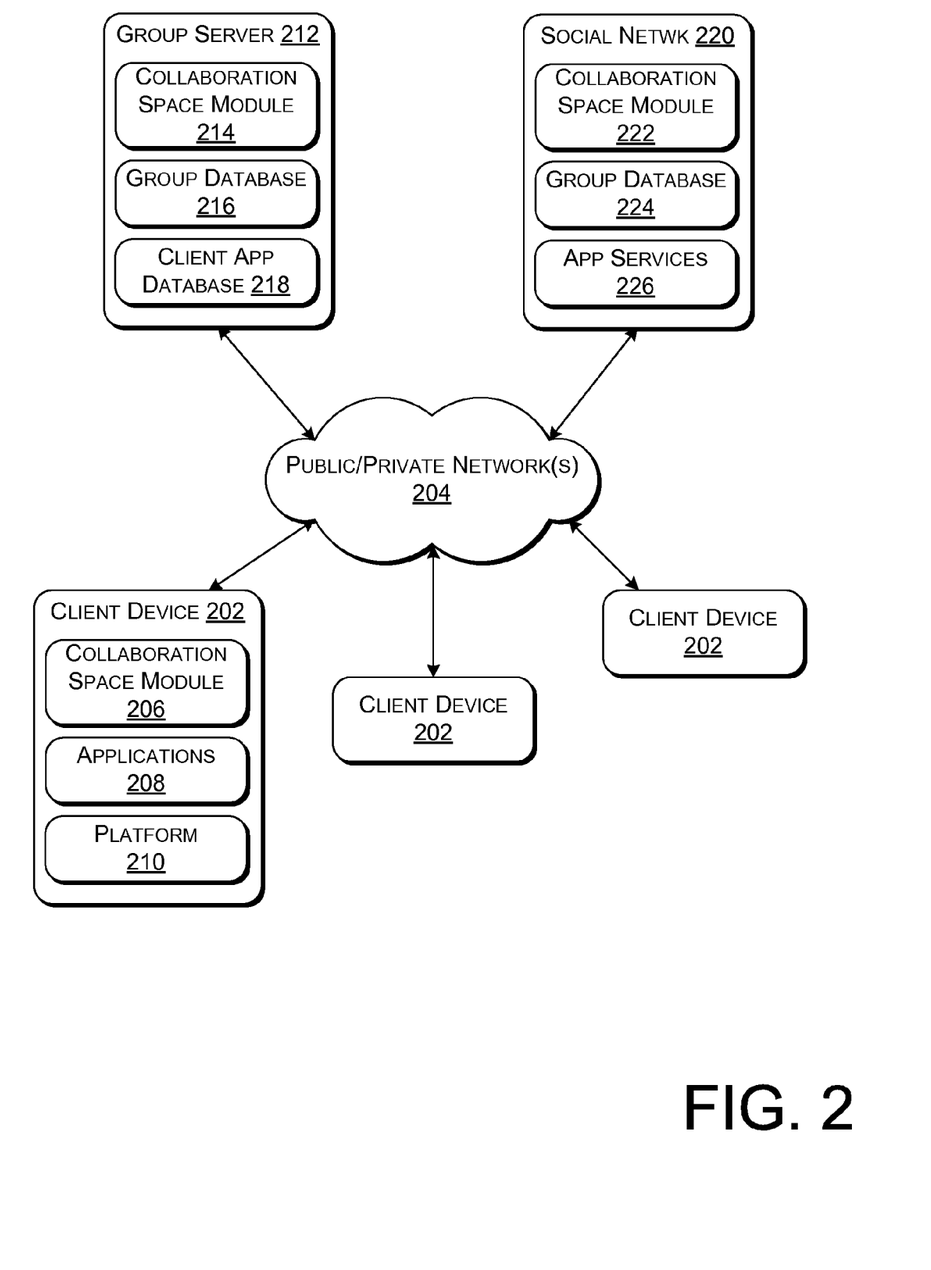
FIG. 2 illustrates an example environment including client devices of a group of users, a group server, and a social network, in accordance with various embodiments.

FIG. 2 illustrates an example environment including client devices of a group of users, a group server, and a social network, in accordance with various embodiments. As illustrated, multiple client devices 202 may share a collaboration space, communicating with one another through public/private network(s) 204. Each client device 202 may include a collaboration space module 206 to manage the collaboration space and automatic creation of content items. Each client device 202 may also include one or more applications 208 and a platform 210.

In some embodiments, the client devices 202 may be connected through the public/private network(s) 204 to a group server 212. The group server 212 may include a collaboration space module 214 to manage or participate in managing the collaboration space and a group database 216 identifying members of a group of users sharing the collaboration space and storing posts to the collaboration space, post metadata, member histories, and/or member profiles. Also, the group server 212 may include a client application database 218 storing content items associated with client device applications 208 or platforms 210 and/or content item metadata.

In addition to the group server 212, or alternative to it, the client devices 202 may be connected through the public/private network(s) 204 to a social network 220. Like the group server 212, the social network 220 may include a collaboration space module 222 to manage or participate in managing the collaboration space and a group database 224 identifying members of a social network group and storing posts to the collaboration space, post metadata, member histories, and/or member profiles. Also, the social network 220 may include one or more application services 226 that are provided to users of client devices 202 separately and distinctly from the collaboration space.

In various embodiments, the client devices 202, group server 212, and/or devices of the social network 220 may each be any sort of computing device, such as a smart phone, a cellular phone, a personal digital assistant (PDA), a tablet computer, a personal computer (PC), a laptop, a desktop, a workstation, a server, a mainframe, a media player, a gaming device, a television, a media center, or the like. Example client devices 202, group servers 212, and/or devices of the social network 220 are illustrated in greater detail in FIG. 5 and are described in detail below with reference to that figure.

The public/private network(s) 204 may be or include one or more public or private networks, such as a local area network (LAN), wide area network (WAN), a personal area network (PAN), the Internet, a packet-switched data network, or a circuit-switched telecommunication network. The network 104 may include a plurality of computing devices. Communication among these computing devices of the network(s) 204 and with the client devices 202, group server 212, and devices of the social network 220 may be wired, wireless, or both. These communications may utilize any sort of communication protocol known in the art for sending and receiving messages, such as the Transmission Control Protocol/Internet Protocol (TCP/IP), the Hypertext Transfer Protocol (HTTP), Extensible Messaging and Presence Protocol (XMPP), and/or the Session Initiation Protocol (SIP).

Figure 3:
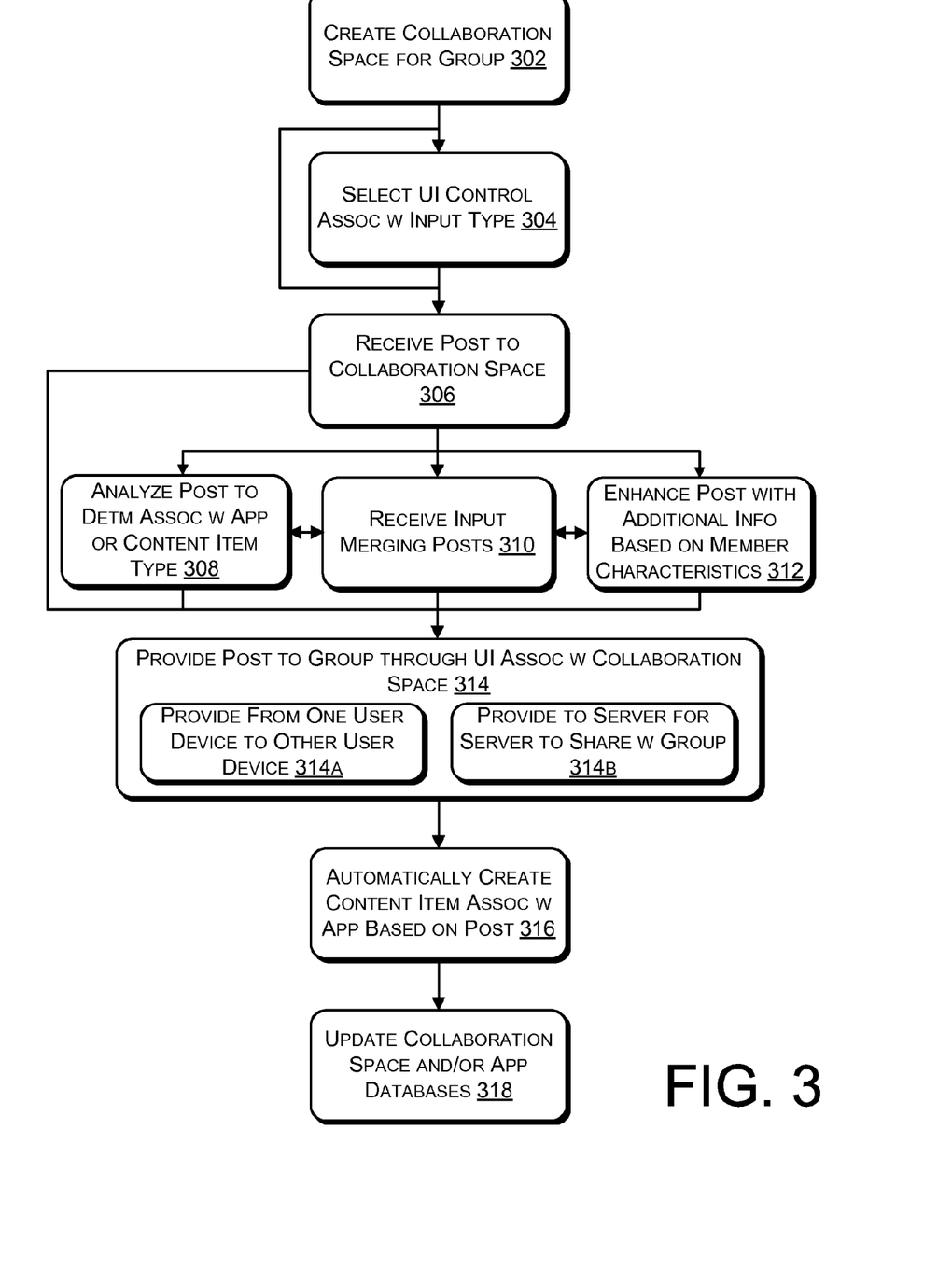
FIG. 3 illustrates a flowchart showing an example client-device-implemented method of providing posts to a collaboration space to users sharing that collaboration space and automatically creating content items for user applications based on the posts, in accordance with various embodiments.

In various embodiments, the collaboration space module 206 may be responsible for managing the participation of its corresponding client device 202 in the collaboration space. The collaboration space module 206 may display the collaboration space user interface, such as collaboration space user interface 104, may receive posts and selections of UI controls from client device users, may provide the received posts to other client devices 202 in a peer-to-peer manner or through a group server 212 or social network 220 in a client-server fashion, and may display posts received from the user of its client device 202 and from users of other client devices 202 through the collaboration space user interface. The collaboration space module 206 may further enhance the posts, analyze the posts, and automatically create content items associated with one of the applications 208 or platform 210. Further, the collaboration space module 206 may receive input merging collaboration spaces and may create a resultant, merged collaboration space in response and may provide the merging input and/or the resultant, merged collaboration space to the client devices of other members of the group of users. These operations performed by the collaboration space module 206 are illustrated in FIG. 3 and described below in further detail with reference to that figure.

Figure 4:
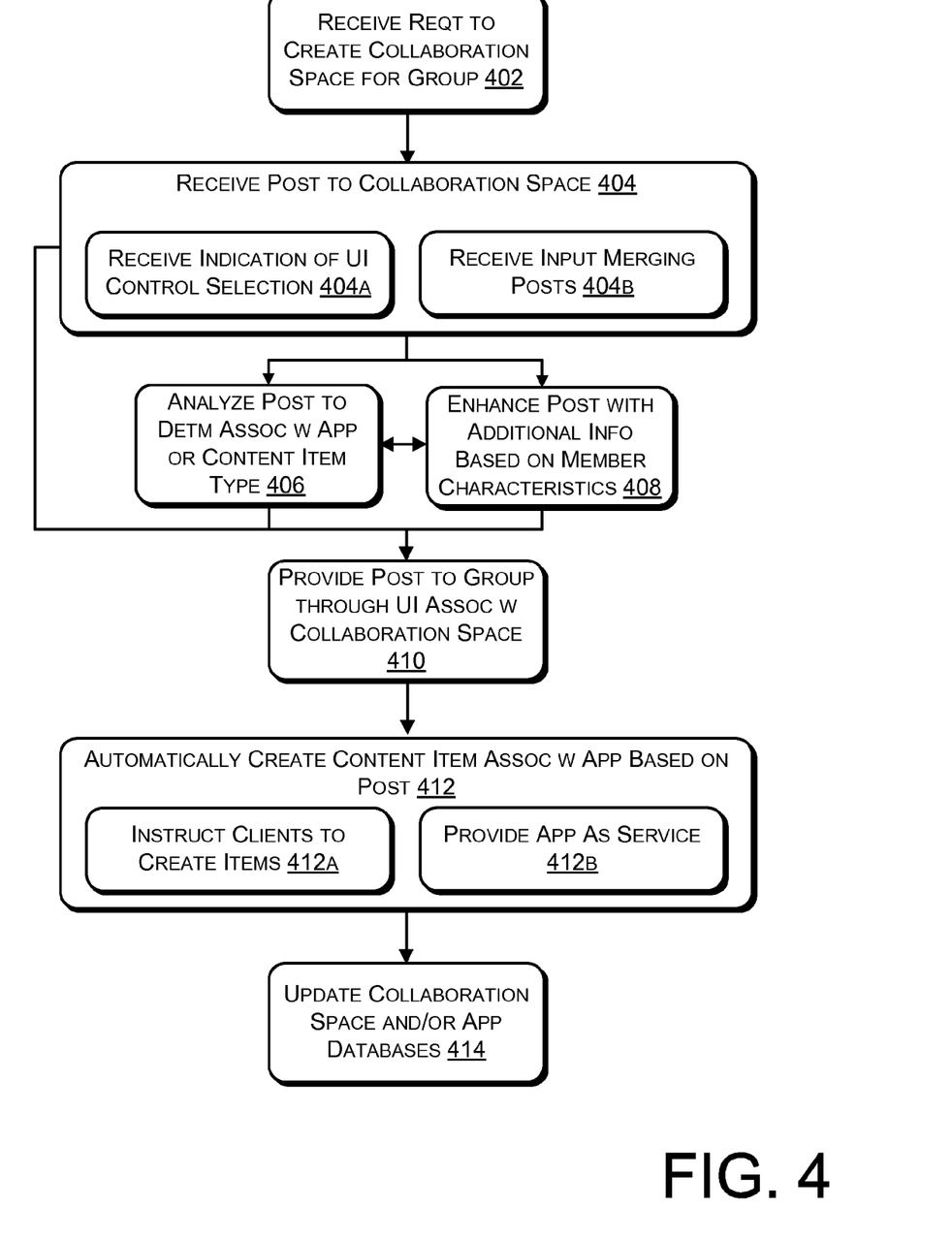
FIG. 4 illustrates a flowchart showing an example server-implemented method of providing posts to a collaboration space to users sharing that collaboration space and automatically creating content items for user applications based on the posts, in accordance with various embodiments.

In other embodiments, the collaboration space module 206 may be a thin client or browser that displays a collaboration space user interface received from a group server 212 or social network 220 and simply relays information or input provided by a user of the client device 202 through that collaboration space user interface. Such embodiments are illustrated in FIG. 4 and described below in further detail with reference to that figure.

In some embodiments, the applications 208 or platform 210 may be any applications or platform that are separate and distinct from the collaboration space module 206 and the collaboration space user interface. The applications 208 or platform 210 may provide any number of services and features to the user of the client device 202. The applications 208 or platform 210 may also create content items in response to instructions from the collaboration space module 206, group server 212, or social network 220. Such instructions may be communicated via one or more interfaces of the collaboration space module 206, the applications 208, and/or the platform 210. The applications 208 or platform 210 may then display the content items through user interfaces of the applications 208 or platform 210.

In various embodiments, the collaboration space module 214 may be responsible for managing the participation of users of a group of users in a collaboration space. The collaboration space module 214 may provide the collaboration space user interface for display on the client devices 202, may receive posts and selections of UI controls from the client devices 202, and may provide the received posts to other client devices 202 for display through the collaboration space user interface. The posts may be stored in the group database 216. The collaboration space module 214 may further enhance the posts, analyze the posts, and automatically create content items associated with one of the applications 208 or platforms 210 of the client devices 202. These automatically created content items may be stored in the client application database 218. Further, the collaboration space module 214 may receive input merging collaboration spaces and may create a resultant, merged collaboration space in response and may provide the resultant, merged collaboration space to the client devices 202. These operations performed by the collaboration space module 214 are illustrated in FIG. 4 and described below in further detail with reference to that figure.

In other embodiments, the collaboration space module 214 may be a thin server that provides client devices 202 with identities of other members of the group of users, with member histories, and/or with member profiles. The identities, member histories, and/or member profiles may be stored in the group database 216. In addition, such a collaboration space module 214 may receive posts to the collaboration space and store the posts in the group database 216. Further, the collaboration space module 214 may receive automatically created content items, instructions to create such content items, and/or content item metadata and may store the items, instructions, and/or metadata in the client application database 218. Such embodiments are illustrated in FIG. 3 and described below in further detail with reference to that figure.

In various embodiments, the social network 220 comprises any one or more computing devices that may be physically coupled or connected by a network, such as any of the networks described above with reference to public/private network(s) 204. The collaboration space module 222 may be responsible for managing the participation of users of a group of users in a collaboration space. The collaboration space module 222 may provide the collaboration space user interface for display on the client devices 202, may receive posts and selections of UI controls from the client devices 202, may provide the received posts to other client devices 202 for display through the collaboration space user interface. The posts may be stored in the group database 224. The collaboration space module 222 may further enhance the posts, analyze the posts, and automatically create content items associated with one of the application services 226. Further, the collaboration space module 222 may receive input merging collaboration spaces and may create a resultant, merged collaboration space in response and may provide the resultant, merged collaboration space to the client devices 202. These operations performed by the collaboration space module 222 are illustrated in FIG. 4 and described below in further detail with reference to that figure.

In some embodiments, the application services 226 may be any services provided by the social network, such as event lists, calendars, polls, photo galleries, etc. These services are provided by application services 226 separately and distinctly from the collaboration space or the social network group and may be associated with their own user interfaces that are provided to the client devices 202 to enable the client devices 202 to access the application services 226.

Example Operations

FIG. 3 illustrates a flowchart showing an example client-device-implemented method of providing posts to a collaboration space to users sharing that collaboration space and automatically creating content items for user applications based on the posts, in accordance with various embodiments. As shown at block 302, a user of a group of users may create a new collaboration space to be shared by the group of users. In some embodiments, the user interface associated with the collaboration space may appear as a representation of a paper note with one or more posts in the collaboration space displayed in the paper note as text and/or graphics.

At block 304, the user may select a UI control that is visually associated with the collaboration space. The UI control may be one of a plurality of UI controls, each associated with a different input type. For example, the UI control may be associated with one of events, polls, pictures, videos, audio clips, or lists. At block 306, the user's device may then receive a post to the collaboration space (e.g., from the user). The post may be accompanied by an indication of which UI control was selected.

In other embodiments, at block 306, the user's device may receive the post without any accompanying user selection of a UI control. In such embodiments, at block 308, the user's device may analyze the post to determine whether the post is associated with an application or content item type. For example, the user's device may determine that the post is associated with an application such as a photo gallery, an event list, a calendar, a poll repository, a list repository, an audio library, or a video library or that the post is associated with a content item type such as photo, event, calendar appointment, poll question, list, audio file, or video file. In some embodiments, the analyzing is based at least in part on user-configurable parameters.

At block 310, in addition to or instead of performing the analyzing at block 308, the user's device may receive input merging the post with another post. In one embodiment, the input may include graphical manipulation of representations of the posts, such as a drag and drop operation. In response to receiving the input, the user's device creates a resultant, merged post. The user's device may also automatically associate the resultant, merged post with an application or content item type.

At block 312, instead of or in addition to the operations shown at block(s) 308 and/or 310, the user's device may enhance the post with additional information based on member or group characteristics. For example, if the post specifies meeting for pizza at 7 p.m., and one member of the group's profile or history indicates a preference for Garlic Jim's™ pizza, the user's device may enhance the post to read "Let's meet for pizza at 7 p.m. at Garlic Jim's™."

At block 314, the user's device may provide the received post to other members of the group for display through a user interface associated with the collaboration space. At block 314a, the user's device may provide the post to other members of the group in a peer-to-peer manner without any need to provide the post to a group server. In such an embodiment, the group server may simply be used to identify members of the group. At block 314b, the user's device may provide the post to a group server for the group server to relay the post to the other members of the group.

At block 316, the user's device may automatically create a content item associated with an application of a device of at least one user of the group of users based on the post, the content item accessible through a user interface of the application. The application may be one of a photo gallery, an event list, a calendar, a poll repository, a list repository, an audio library, or a video library and the content item may be a corresponding one of a photo, an event, a calendar appointment, a poll question, a list, an audio file, or a video file. In some embodiments, the automatic creating comprises instructing each member of the group of users to automatically create the content item associated with the application based on the post. Also, in some embodiments, the automatic creating may be based on a UI control selected by the user or on results of the analysis of the post by the user's device.

At block 318, the user's device may update one or more databases associated with the collaboration space and/or the application to include the post, metadata associated with the post, the content item, or metadata associated with the content item. The one or more databases may then be used to construct the contents shown by the user interfaces of the collaboration space and/or the application. In some embodiments, updating the one or more databases comprises providing the post to a database of a server associated collaboration space to update the database to include the post.

FIG. 4 illustrates a flowchart showing an example server-implemented method of providing posts to a collaboration space to users sharing that collaboration space and automatically creating content items for user applications based on the posts, in accordance with various embodiments. As shown at block 402, a user of a group of users may request creation of a new collaboration space to be shared by the group of users. In some embodiments, the group of users may a social network or a social network group. The server receiving the request may be a group server or a server belonging to a social network.

At block 404, the server receives a post to the collaboration space from a member of the group of users, the member providing the post through a client device. At block 404a, the post may be accompanied by an indication of a UI control selected by the member when providing the post. The UI control may be visually associated with the collaboration space on the client device and may be one of a plurality of UI controls each associated with a different input type. For example, the UI control may be associated with one of events, polls, pictures, videos, audio clips, or lists. At block 404b, the post may be accompanied by input merging the post with another post. In one embodiment, the input may include graphical manipulation of representations of the posts, such as a drag and drop operation. In response to receiving the input, the server creates a resultant, merged post and provides the resultant, merged post to client devices of members of the group of users. The server may also automatically associate the resultant, merged post with an application or content item type. Further, in some embodiments, the receipt of input merging posts may be received separately from input creating new posts.

At block 406, the server may analyze the post to determine whether the post is associated with an application or content item type. For example, the server may determine that the post is associated with an application such as a photo gallery, an event list, a calendar, a poll repository, a list repository, an audio library, or a video library or that the post is associated with a content item type such as photo, event, calendar appointment, poll question, list, audio file, or video file. In some embodiments, the analyzing is based at least in part on user-configurable parameters.

At block 408, in addition to or instead of performing the analyzing at block 406, the server may enhance the post with additional information based on member or group characteristics. For example, if the post specifies meeting for pizza at 7 p.m., and one member of the group's profile or history indicates a preference for Garlic Jim's™ pizza, the server may enhance the post to read "Let's meet for pizza at 7 p.m. at Garlic Jim's™" and provide the enhanced post to client devices of members of the group of users.

At block 410, the server may provide the received post to the members of the group for display through a user interface associated with the collaboration space. Such as user interface may be provided, for example, by a client application associated with the collaboration space on the client devices or by a web page provided by the server for display through browsers on the client devices.

At block 412, the server may automatically create a content item associated with an application of a device of at least one user of the group of users based on the post, the content item accessible through a user interface of the application. The application may be one of a photo gallery, an event list, a calendar, a poll repository, a list repository, an audio library, or a video library and the content item may be a corresponding one of a photo, an event, a calendar appointment, a poll question, a list, an audio file, or a video file. The application may also be separate and distinct from the collaboration space. In some embodiments, at block 412a, the automatic creating comprises instructing each member of the group of users to automatically create the content item associated with the application based on the post. Alternatively, at block 412b, the automatic creating may comprise providing the application as a service to users through their client devices. Also, in some embodiments, the automatic creating may be based on a UI control selected by the user or on results of the analysis of the post by the server.

At block 414, the server may update one or more databases associated with the collaboration space and/or the application to include the post, metadata associated with the post, the content item, or metadata associated with the content item. The one or more databases may then be used to construct the contents shown by the user interfaces of the collaboration space and/or the application.

Example Systems

Figure 5:
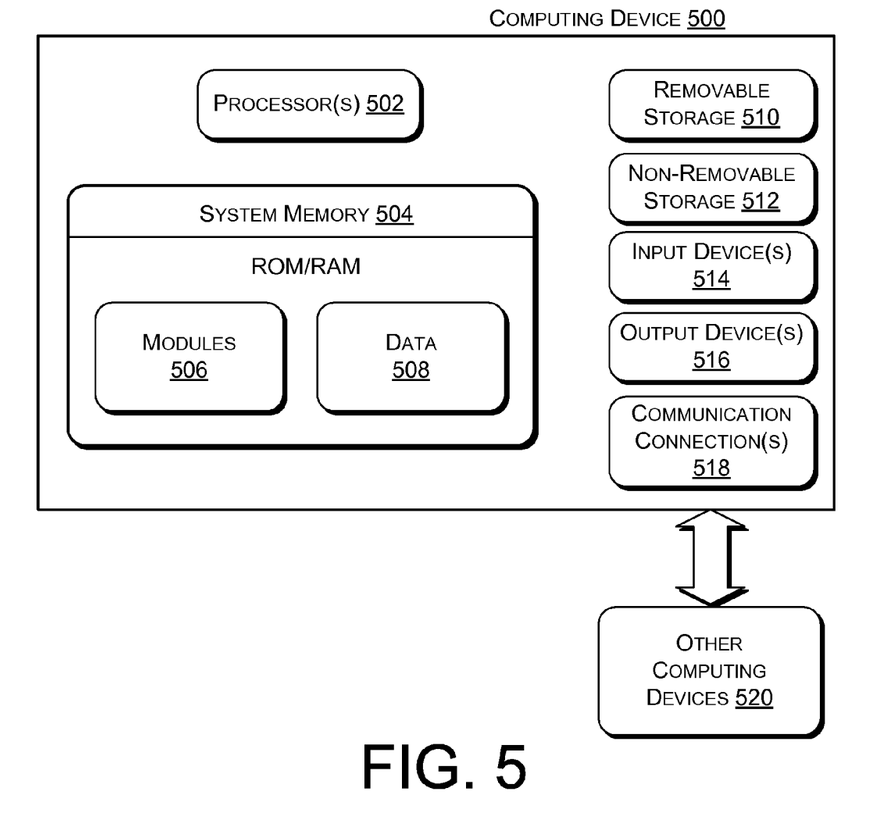
FIG. 5 illustrates an example computing device system architecture, in accordance with various embodiments.

FIG. 5 illustrates an example computing device system architecture, such as a system architecture of a client device 202, a group server 212, or one of the computing devices of the social network 220, in accordance with various embodiments. As illustrated, the computing device 500 includes processor(s) 502, a system memory 504 storing modules 506 and data 508, a removable storage 510, a non-removable storage 512, input device(s) 514, output device(s) 516, and communication connections 518 for communicating with other computing devices 520.

In some embodiments, the processor(s) 502 is a central processing unit (CPU), a graphics processing unit (GPU), or both CPU and GPU, or other processing unit or component known in the art.

In various embodiments, system memory 504 is volatile (such as RAM), non-volatile (such as ROM, flash memory, etc.) or some combination of the two. Example system memory 504 may include one or more of RAM, ROM, EEPROM, a Flash Memory, a miniature hard drive, a memory card, an optical storage, a magnetic cassette, a magnetic tape, a magnetic disk storage or another magnetic storage device, or any other medium.

As previously mentioned, the system memory 504 stores modules 506 and data 508. These modules 506 and data 508 may comprise any one or more modules, applications, processes, threads, classes, algorithms, data structures, files, and/or databases, such as the modules, applications, processes, threads, classes, algorithms, data structures, files, and/or databases utilized in performing the operations described above, some part of which are illustrated in FIGS. 3-4.

The computing device 500 includes data storage devices (removable and/or non-removable) in addition to the system memory 504, such as, for example, magnetic disks, optical disks, or tape. Such additional storage is illustrated in FIG. 5 by removable storage 510 and non-removable storage 512. Computer storage media may include volatile and nonvolatile, removable and non-removable media implemented in any method or technology for storage of information, such as computer readable instructions, data structures, program modules, or other data. System memory 504, removable storage 510, and non-removable storage 512 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 500. Any such computer-readable storage media may be part of the computing device 500.

In various embodiment, any or all of system memory 504, removable storage 510, and non-removable storage 512 store programming instructions which, when executed, implement some or all of the above-described operations of the computing device 500.

The computing device 500 also has input device(s) 514, such as a keyboard, a mouse, a touch-sensitive display, voice input device, etc., and output device(s) 516 such as a display, speakers, a printer, etc. These devices are well known in the art and need not be discussed at length here.

The computing device 500 also contains communication connections 518 that allow the computing device 500 to communicate with other computing devices 520.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A system comprising:
   one or more processors; and
   a plurality of executable instructions configured to be implemented by the one or more processors to perform operations including:
   receiving input that graphically manipulates a representation of a collaboration space shared by a group of users by bringing the representation into contact or proximity with a representation of a second collaboration space to merge the collaboration space with the second collaboration space;

creating a resulting, merged collaboration space based at least in part on the received input; and responsive to creating the resulting, merged collaboration space, automatically creating a content item associated with an application of a device of at least one user of the group of users, wherein the content item is not included in a post to any of the collaboration space, the second collaboration space, or the resulting, merged collaboration space received from any of the users and is accessible through a user interface of the application.

2. The system of claim 1, wherein the automatic creating comprises automatically creating, for each member of the group of users, a content item associated with an application of each device of each member based on the post.

3. The system of claim 1, wherein the post is responsive to a selection of one of a plurality of controls of a user interface associated with the collaboration space, each control associated with a different application or content item type.

4. The system of claim 3, wherein the automatic creating is based at least in part on which control of the plurality of controls is selected.

5. The system of claim 1, wherein the operations further comprise updating a database associated with the collaboration space to include the post and/or a database associated with the application to include the content item.

6. The system of claim 1, wherein the operations further comprise providing the post to a database of a server associated collaboration space to update the database to include the post.

7. The system of claim 1, wherein the group of users comprises a social network or a group within the social network.

8. The system of claim 7, wherein the application is an application provided by the social network that is separate and distinct from the collaboration space.

9. The system of claim 1, wherein a user interface associated with the collaboration space appears as a representation of a paper note with one or more posts in the collaboration space displayed in the paper note as text and/or graphics.

10. The system of claim 1, wherein the resulting, merged collaboration space is automatically associated with an application or content item type.

11. The system of claim 1, wherein the operations further comprise automatically enhancing the post with additional information based on characteristics of at least one member of the group of users.

12. The system of claim 1, wherein the operations further comprise receiving the post and providing the post to the group of users through a user interface associated with the resulting, merged collaboration space.

13. The system of claim 1, wherein the application is one of a photo gallery, an event list, a calendar, a poll repository, a list repository, an audio library, or a video library and the content item is a corresponding one of a photo, an event, a calendar appointment, a poll question, a list, an audio file, or a video file.

14. A computer-implemented method comprising:

receiving input that graphically manipulates a representation of a collaboration space shared by a group of users by bringing the representation into contact or proximity with a representation of a second collaboration space to merge the collaboration space with the second collaboration space;

creating a resulting, merged collaboration space based at least in part on the received input; and responsive to creating the resulting, merged collaboration space, automatically creating a content item associated with an application of a device of at least one user of the group of users, wherein the content item is not included in a post to any of the collaboration space, the second collaboration space, or the resulting, merged collaboration space received from any of the users and is accessible through a user interface of the application.

15. The computer-implemented method of claim 14, further comprising receiving the post and providing the post to the group of users through a user interface associated with the resulting, merged collaboration space.

16. The computer-implemented method of claim 14, wherein the application is one of a photo gallery, an event list, a calendar, a poll repository, a list repository, an audio library, or a video library and the content item is a corresponding one of a photo, an event, a calendar appointment, a poll question, a list, an audio file, or a video file.

17. The computer-implemented method of claim 14, wherein the group of users comprises a social network or a group within the social network.

18. A non-transitory computer-readable medium having instructions stored thereon which, when executed by a computing device, perform operations comprising:

receiving input that graphically manipulates a representation of a collaboration space shared by a group of users by bringing the representation into contact or proximity with a representation of a second collaboration space to merge the collaboration space with the second collaboration space;

creating a resulting, merged collaboration space based at least in part on the received input; and responsive to creating the resulting, merged collaboration space, automatically creating a content item associated with an application of a device of at least one user of the group of users, wherein the content item is not included in a post to any of the collaboration space, the second collaboration space, or the resulting, merged collaboration space received from any of the users and is accessible through a user interface of the application.

19. The non-transitory computer-readable medium of claim 18, wherein the operations further comprise receiving the post and providing the post to the group of users through a user interface associated with the resulting, merged collaboration space.

20. The non-transitory computer-readable medium of claim 18, wherein the application is one of a photo gallery, an event list, a calendar, a poll repository, a list repository, an audio library, or a video library and the content item is a corresponding one of a photo, an event, a calendar appointment, a poll question, a list, an audio file, or a video file.

* * * * *